US012528962B2

(12) United States Patent
Nishimura et al.

(10) Patent No.: US 12,528,962 B2
(45) Date of Patent: Jan. 20, 2026

(54) COATING MATERIAL COMPOSITION, COATING FILM, AND COATED ARTICLE

(71) Applicant: DAIKIN INDUSTRIES, LTD., Osaka (JP)

(72) Inventors: Hiroshi Nishimura, Osaka (JP); Yuu Kadowaki, Osaka (JP); Yasukazu Nakatani, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 469 days.

(21) Appl. No.: 18/094,314

(22) Filed: Jan. 6, 2023

(65) Prior Publication Data

US 2023/0151241 A1    May 18, 2023

Related U.S. Application Data

(63) Continuation-in-part of application No. PCT/JP2021/025416, filed on Jul. 6, 2021.

(30) Foreign Application Priority Data

Jul. 9, 2020   (JP) ................. 2020-118686

(51) Int. Cl.
    C09D 7/20      (2018.01)
    C09D 7/40      (2018.01)
    C09D 127/18    (2006.01)
    C09D 179/08    (2006.01)

(52) U.S. Cl.
    CPC ............. *C09D 127/18* (2013.01); *C09D 7/20* (2018.01); *C09D 7/40* (2018.01); *C09D 179/08* (2013.01)

(58) Field of Classification Search
    CPC ....... C09D 127/18; C09D 7/40; C09D 179/08
    See application file for complete search history.

(56) References Cited

U.S. PATENT DOCUMENTS

| 5,626,907 A | 5/1997 | Hagiwara et al. |
| 2004/0224856 A1 | 11/2004 | Saiki et al. |
| 2015/0166924 A1 | 6/2015 | Yamaguchi et al. |
| 2015/0299513 A1 | 10/2015 | Kelly et al. |
| 2018/0187029 A1* | 7/2018 | Sperindio ............... C09D 7/61 |

FOREIGN PATENT DOCUMENTS

| CN | 103173117 A | 6/2013 | |
| EP | 2428539 A1 * | 3/2012 | ............... C08K 3/04 |
| EP | 3584281 A1 * | 12/2019 | ........... C09D 179/08 |
| JP | 2001011372 A * | 1/2001 | |
| JP | 2004-315618 A | 11/2004 | |
| JP | 2014-062237 A | 4/2014 | |
| JP | 2015-515501 A | 5/2015 | |
| JP | 2017-517582 A | 6/2017 | |
| JP | 2018-524440 A | 8/2018 | |
| JP | 2020-015880 A | 1/2020 | |
| WO | WO-2013106421 A1 * | 7/2013 | ............. C09D 5/002 |

OTHER PUBLICATIONS

JP-2001011372-A English translation. (Year: 2001).*
International Preliminary Report on Patentability with the translation of Written Opinion dated Jan. 10, 2023 from the International Bureau in International Application No. PCT/JP2021/025416.
International Search Report for PCT/JP2021/025416 dated Oct. 5, 2021.

* cited by examiner

*Primary Examiner* — Hai Y Zhang
(74) *Attorney, Agent, or Firm* — Sughrue Mion, PLLC

(57) ABSTRACT

Provided is a coating material composition that does not use N-methyl-2-pyrrolidone and has the same performance as conventional ones. The coating material composition contains polytetrafluoroethylene, a polyamideimide resin, and a filler, and being substantially free of N-methyl-2-pyrrolidone, wherein the filler has a hardness of 7 to 12 on a new Mohs hardness scale and a primary particle size of 1 μm or less, wherein the content of the filler is 10 to 30 parts by mass relative to 100 parts by mass of a solid content of the polyamideimide resin in the coating material components, wherein the coating material composition has a viscosity of 10,000 to 20,000 cps, and wherein a degree of dispersion of the coating material as measured according to JIS K5600 with a grind gauge is 5 μm or less.

8 Claims, No Drawings

COATING MATERIAL COMPOSITION, COATING FILM, AND COATED ARTICLE

CROSS-REFERENCE TO RELATED APPLICATIONS

This application is a Continuation-in-Part of International Application No. PCT/JP2021/025416 filed on Jul. 6, 2021, claiming priority based on Japanese Patent Application No. 2020-118686 filed on Jul. 9, 2020, the respective disclosures of which are incorporated herein by reference in their entireties.

TECHNICAL FIELD

The present disclosure relates to a coating material composition, a coating film, and a coated article.

BACKGROUND ART

Polyamideimide resin is a resin classified as super engineering plastics, and has excellent performance such as having high heat resistance, maintaining abrasion resistance and a sliding property even under high temperatures, and also having excellent dimensional stability.

Patent Literature 1 discloses a composition containing a polyamideimide resin and polytetrafluoroethylene and using a β-alkoxypropionamide solvent as a solvent.

Patent Literature 2 discloses use of 3-methoxy-N,N-dimethylpropanamide as a solvent used for dissolution of a polyamideimide.

Patent Literature 3 discloses a heat resistant resin composition containing a polyamideimide resin and an amide solvent.

CITATION LIST

Patent Literature

Patent Literature 1: Japanese Translation of PCT International Application Publication No. 2018-524440
Patent Literature 2: Japanese Translation of PCT International Application Publication No. 2017-517582
Patent Literature 3: Japanese Patent Laid-Open No. 2020-015880

SUMMARY

The present disclosure is a coating material composition containing polytetrafluoroethylene, a polyamideimide resin, and a filler, and being substantially free of N-methyl-2-pyrrolidone,
  wherein the filler has a hardness of 7 to 12 on a new Mohs hardness scale and a primary particle size of 1 μm or less,
  wherein a content of the filler is 10 to 30 parts by mass relative to 100 parts by mass of a solid content of the polyamideimide resin in the coating material components,
  wherein the coating material composition has a viscosity of 10,000 to 20,000 cps, and
  wherein a degree of dispersion of a coating material as measured according to JIS K5600 with a grind gauge is 5 μm or less.

Advantageous Effects of Invention

The coating material composition of the present disclosure has an excellent strength and durability and has the same performance as conventional ones in terms of frictional resistance, in spite of no use of N-methyl-2-pyrrolidone.

DESCRIPTION OF EMBODIMENTS

The present disclosure will be described in detail below.

Conventionally, when a polyamideimide resin is used as a binder resin in a coating material composition, a polyamideimide resin that contains N-methyl-2-pyrrolidone as a solvent has been used. N-methyl-2-pyrrolidone is a resin having excellent solubility, which enables a suitable coating material composition to be obtained by using thereof.

In recent years, a coating material composition that does not use such N-methyl-2-pyrrolidone has been requested from various viewpoints. For this reason, use of other solvents that dissolve a polyamideimide resin has been proposed, such as in Patent Literatures 1 to 3. However, the coating material composition that does not use N-methyl-2-pyrrolidone necessitates use of a lower molecular weight resin as compared with the case of using N-methyl-2-pyrrolidone. This is because the solubility of the solvent decreases, rendering a high molecular weight resin difficult to dissolve.

Lowering a molecular weight results in a decrease in performance such as strength and durability, thus it has been requested to improve these characteristics and to achieve the same performance as that of conventional coating material compositions without using N-methyl-2-pyrrolidone.

It is important that the coating material composition of the present disclosure has a degree of dispersion of the coating material of 5 μm or less, as measured with a grind gauge according to JIS K5600.

Powder components compounded in a coating material composition generate aggregates in powder form and tend to contain coarse aggregated particles. In the coating material composition of the present disclosure, the problem is improved by pulverizing the aggregated particles to allow the degree of dispersion of the coating material as measured according to JIS K5600 to be 5 μm or less. In other words, the problem was improved by allowing both the polytetrafluoroethylene and the filler, which were the powder components contained in the coating material composition, to be formed into particles in which aggregates were sufficiently pulverized.

Although the action by which such an effect is achieved is not clear, it is presumed that a composition with high uniformity is obtained by dispersing particles so as to have a small degree of dispersion, then enabling a uniform coating film to be formed and improving coating film properties.

The degree of dispersion of the coating material as measured with a grind gauge according to JIS K5600 is a value measured based on the description of JIS.

The degree of dispersion is preferably 5 μm or less.

The composition having a degree of dispersion of 5 μm or less can be obtained by sufficiently conducting treatment such that particles are pulverized upon preparation of the coating material.

The present disclosure is a coating material composition containing polytetrafluoroethylene, a polyamideimide resin, and a filler, and being substantially free of N-methyl-2-pyrrolidone. Hereinafter, each of the components contained will be described.

(Polytetrafluoroethylene)

The polytetrafluoroethylene (hereinafter sometimes referred to as PTFE) is a polymer of tetrafluoroethylene. The PTFE may be a homo-PTFE containing only TFE units or a modified PTFE containing TFE units and modifying monomer units based on the modifying monomer that is copolymerizable with TFE.

Moreover, the PTFE is preferably a low molecular weight PTFE that is melt-fabricable and non-fibrillatable.

The modifying monomer is not limited as long as it is copolymerizable with TFE, and examples thereof include perfluoro olefins such as hexafluoropropylene [HFP]; chlorofluoro olefins such as chlorotrifluoroethylene [CTFE]; hydrogen-containing fluoro olefins such as trifluoroethylene and vinylidene difluoride [VDF]; perfluoro vinyl ethers; perfluoroalkylethylenes; ethylene; and fluorine-containing vinyl ethers having nitrile groups. In addition, the modifying monomer for use may be one type thereof or a plurality of types thereof.

The perfluoro vinyl ether is not limited and examples thereof include an unsaturated perfluoro compound represented by the following formula (1)

$$CF_2=CF-ORf^1 \quad (1)$$

wherein $Rf^1$ represents a perfluoro organic group. The "perfluoro organic group" herein refers to an organic group in which all hydrogen atoms bonded to carbon atoms are replaced with fluorine atoms. The perfluoro organic group may have an ether oxygen.

Examples of the perfluoro vinyl ether include a perfluoro (alkyl vinyl ether) [PAVE] in which $Rf^1$ represents a perfluoroalkyl group having 1 to 10 carbon atoms in formula (1). The number of carbon atoms of the perfluoroalkyl group is preferably 1 to 5.

Examples of the perfluoroalkyl group in PAVE include a perfluoromethyl group, a perfluoroethyl group, a perfluoropropyl group, a perfluorobutyl group, a perfluoropentyl group, and a perfluorohexyl group, and perfluoropropyl vinyl ether [PPVE] in which the perfluoroalkyl group is a perfluoropropyl group is preferred.

The modified PTFE preferably has a modifying monomer unit in a range of 0.001 to 2% by mole and more preferably 0.001 to 1% by mole.

The PTFE preferably has a melt viscosity (MV) of $1.0\times10$ Pa·s or more, more preferably $1.0\times10^2$ Pa·s or more, and still more preferably $1.0\times10^3$ Pa·s or more.

The melt viscosity can be determined in accordance with ASTM D 1238, by using a flow tester (manufactured by Shimadzu Corporation) and a 2φ-8L die and measuring the melt viscosity of 2 g of a sample having been preliminarily heated for 5 minutes at the measurement temperature (380° C.) under a load of 0.7 MPa while maintaining the temperature.

The PTFE preferably has a standard specific gravity (SSG) of 2.130 to 2.230, more preferably 2.140 or more, and more preferably 2.190 or less.

The standard specific gravity (SSG) herein can be measured based on a water displacement method, in accordance with ASTM D 4895-89.

The PTFE preferably has a melting point of 324 to 360° C. The melting point of the fluororesin herein is a value obtained as a temperature corresponding to the local maximum value in a heat-of-fusion curve when the temperature is increased at a rate of 10° C./minute by using a differential scanning calorimeter (DSC).

The PTFE also does not dissolve in a solvent and is present in the coating material composition in powder form, and thus PTFE having a small particle size as a raw material is preferably used. Specifically, PTFE having a primary particle size of 5 μm or less is preferably used. In is noted that a measurement method of the primary particle size is the same as that of a primary particle size of the filler, which will be described in detail below.

In the coating material composition of the present disclosure, the PTFE is preferably in an amount of 20 to 60% by mass relative to the total solid content of coating material composition. The PTFE in such a range is preferred in terms of enabling the sliding property of the coating film and adhesion to a substrate to be secured. The lower limit of the amount is more preferably 25% by mass and still more preferably 30% by mass. The upper limit of the amount is more preferably 55% by mass and still more preferably 50% by mass.

(Polyamideimide Resin)

The polyamideimide resin is a resin typically obtained by a reaction of an acid component and a diisocyanate component, and has a structural moiety derived from the acid component and a structural moiety derived from the diisocyanate component.

(Acid Component)

The acid component is not limited and includes at least an aromatic tribasic acid anhydride and/or an aromatic tribasic acid halide. In one embodiment, the acid component preferably contains at least an aromatic tribasic acid anhydride, and more preferably contains trimellitic acid anhydride among them. Therefore, in one embodiment, the polyamideimide resin preferably has the structure represented by the following formula (I).

[Formula 1]

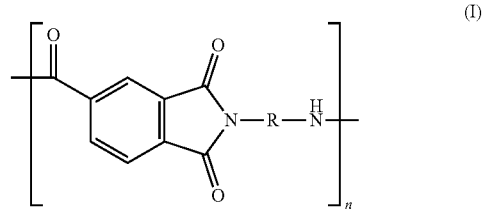

In the structure represented by formula (1), R is an organic group (structural moiety) derived from the diisocyanate component, and n is an integer of 1 or more.

The content of trimellitic anhydride is preferably 50% by mole or more based on the total amount (100% by mole) of acid components constituting the polyamideimide resin. In one embodiment, the content of the trimellitic anhydride may be 100% by mole.

In other embodiments, the content of trimellitic anhydride may be 50% by mole to 95% by mole, and 5% by mole to 50% by mole of other acid components may be contained based on the total amount (100% by mole) of acid components constituting the polyamideimide resin.

For example, a dicarboxylic acid may be used as the other acid component. As the dicarboxylic acid, for example, succinic acid, glutaric acid, adipic acid, pimelic acid, suberic acid, azelaic acid, sebacic acid, phthalic acid, isophthalic acid, and terephthalic acid may be used. These compounds may also be used singly or in combinations of two or more thereof.

(Diisocyanate Component)

The diisocyanate component preferably contains at least an aromatic diisocyanate. Therefore, in one embodiment, R is preferably an organic group derived from the aromatic diisocyanate in formula (I). The content of the aromatic diisocyanate is preferably 30% by mole or more and more preferably 40% by mole or more based on the total amount (100% by mole) of diisocyanate components constituting the polyamideimide resin. In one embodiment, the content of the aromatic diisocyanate may be 100% by mole.

The aromatic diisocyanate contains one or more selected from the group consisting of 4,4'-diphenylmethane diisocyanate, 3,3'-dimethyl-4,4'-diisocyanatobiphenyl, 2,4-toluene diisocyanate, and 2,6-toluene diisocyanate. Among the aromatic diisocyanates, 4,4'-diphenylmethane diisocyanate is preferred.

Therefore, the content of the aromatic diisocyanate containing 4,4'-diphenylmethane diisocyanate is preferably 30% by mole or more, and more preferably 40% by mole or more, and may be 100% by mole, based on the total amount of diisocyanate components constituting the polyamideimide resin.

In one embodiment, the content of 4,4'-diphenylmethane diisocyanate, based on the total amount of diisocyanate components constituting the polyamideimide resin may be 100% by mole. In other embodiments, the content of 4,4'-diphenylmethane diisocyanate, based on the total amount of diisocyanate components constituting the polyamideimide resin, may be 30% by mole to 95% by mole, and the content of of other aromatic diisocyanates may be 5% by mole to 70% by mole.

In the coating material composition of the present disclosure, the polyamideimide resin preferably has a number-average molecular weight of 5,000 to 50,000. Namely, the resin with such a relatively low molecular weight range is preferably used in order to obtain solubility for solvents that are substantially free of N-methyl-2-pyrrolidone. The lower limit of the number-average molecular weight is preferably 10,000, and more preferably 15,000 or more. The upper limit of the number-average molecular weight is preferably 30,000, and more preferably 250,000.

The number-average molecular weight of the polyamideimide resin herein is a value measured by a gel permeation chromatograph (GPC).

In the coating material composition of the present disclosure, the polyamideimide resin is preferably in an amount of 40 to 80% by mass relative to the total solid content of the coating material composition. The lower limit of the amount is more preferably 50% by mass. The upper limit of the amount is more preferably 77% by mass, and still more preferably 75% by mass.

(Filler)

The present disclosure contains a filler. The filler that has a hardness of 7 to 12 on the new Mohs hardness scale and a primary particle size of 1 μm or less, is used.

Mohs hardness is a relative hardness of a substance evaluated on a scale which ranges from 1 to 10, while the new Mohs hardness is such that hardness is evaluated on a scale classified in more detail into 15 stages compared to a scale of 10 stages of Mohs hardness.

The filler having a hardness of 7 to 12 on the new Mohs hardness scale is not limited and is preferably at least one selected from the group consisting of aluminum oxide, silicon dioxide, fluorinated diamond, corundum, silica stone, boron nitride, silica, mica, chrysoberyl, topaz, beryl, garnet, quartz, glass flakes, fused zirconia, tantalum carbide, titanium carbide, and tungsten carbide. Among them, the filler is particularly preferably at least one selected from the group consisting of aluminum oxide and silicon dioxide.

The filler has a primary particle size of 1 μm or less. In the present disclosure, the degree of dispersion of the coating material measured with a grind gauge according to JIS K5600 is essentially 5 μm or less. In order to adjust the degree of dispersion to be within a specified range, a filler having a fine primary particle size is used.

An average particle size of the primary particles is measured as follows. First, particles in a field of view are photographed by using a transmission electron microscope or a scanning electron microscope. Then, the longest length (maximum length) of inner sizes of respective particles is determined for each of 300 primary particles constituting an aggregate on the two-dimensional image. The average value of the maximum lengths of the respective particles is defined as the average particle size of the primary particles.

The coating material composition of the present disclosure contains the filler at a proportion of 10 to 30% by mass relative to 100 parts by mass of the solid content of the aforementioned polyamideimide resin in the coating material components. The content less than 10% by mass causes a problem in terms of reduction of the abrasion resistance. The content exceeding 30% by mass causes a problem in terms of deteriorating the sliding property of the surface of the coating film. The lower limit of the content is more preferably 11% by mass and still more preferably 13% by mass. The upper limit of the content is more preferably 25% by mass and still more preferably 20% by mass.

(Solvent)

The coating material composition of the present disclosure is substantially free of N-methyl-2-pyrrolidone. This has an advantage of not causing a problem due to N-methyl-2-pyrrolidone for use. The term "substantially free" refers to a content of 0.3% by mass or less of N-methyl-2-pyrrolidone in the coating material composition.

The coating material composition of the present disclosure contains, instead of N-methyl-2-pyrrolidone, an organic solvent that dissolves the polyamideimide resin. Specifically, examples of such a solvent include N-ethyl-2-pyrrolidone (NEP), 3-methoxy-N,N-dimethylpropanamide, and N-butyl-2-pyrrolidone (NBP). A mixture of two or more thereof may be used.

The content of the solvent is not limited and can generally be 30 to 70% by mass relative to the total amount of coating material composition.

(Viscosity)

The coating material composition of the present disclosure has a viscosity of 10,000 to 20,000 cps. The viscosity within the range renders workability favorable in a coating step. Furthermore, it is also desirable in terms of obtaining a predetermined film thickness.

The viscosity is a value measured at 25° C. by using a Type B viscometer as described in JISZ8803. The lower limit of the viscosity is more preferably 12,000 cps and still more preferably 15,000 cps. The upper limit of the viscosity is more preferably 19,000 cps and still more preferably 18,000 cps.

The viscosity can be set within the aforementioned range by appropriately adjusting the compositional features of the coating material composition, the amount of the solvent to be compounded, a molecular weight of the component dissolved in the solvent among the resin to be used, and the like.

(Other Components)

The coating material composition of the present disclosure may contain other components in addition to the aforementioned components to the extent that does not impair the purpose of the present disclosure.

Examples of the other components include at least one resin selected from the group consisting of a polyethersulfone (PES), a polyetheretherketone (PEEK), and a polyimide (PI). By compounding these resins, the abrasion resistance of the coating film can be improved. The amount of these resins to be compounded is not limited and is preferably 5 to 40% by mass relative to the total amount of coating material composition of the present disclosure.

The coating material composition of the present disclosure may contain an epoxy resin. By compounding the epoxy resin, it may be possible to obtain an effect of being capable of obtaining a cross-linked product with the polyamideimide. The epoxy resin is not limited, and any known epoxy resin may be used. The amount to be compounded is not limited, and can be, for example, 10% by mass or less relative to the solid content mass of the polyamideimide.

(Production Method of Coating Material Composition)

The coating material composition of the present disclosure can be produced by mixing the aforementioned components. Furthermore, it is important for the coating material composition of the present disclosure to have a degree of dispersion of 5 μm or less. Therefore, upon mixing, a means such that aggregated particles are pulverized to have a particle size of 5 μm or less is preferred for mixing.

Specifically, the aggregates can be appropriately pulverized by using various types of known mills such as a bead mill, a ball mill, and a three-roll mill, and these mills may be appropriately combined as necessary, and by adjusting crushing conditions, crushing time, and a compounding ratio of the resin components combined for use, or the like, enabling the degree of dispersion to be 5 μm or less. The conditions that enable adequate pulverizing are preferably selected.

(Coating Film)

The coating film formed of the coating material composition of the present disclosure is an object of the present disclosure as well. The coating film can be formed by general methods.

The coating film of the present disclosure preferably has an abrasion resistance of 100 or more as measured by the method described in Examples herein. With such abrasion resistance, the coating film can be made strong and durable to obtain a coating film applicable in applications where the sliding property is required. It is noted that the abrasion resistance refers to a value measured by the method described in Examples.

The coating film of the present disclosure is limited by the production method thereof. However, it is difficult and not in accordance with the actual situation to define the difference in structure or the like between the films formed as the coating films by using the coating material composition and those formed by other methods, in terms of a difference in film state. Therefore, it is to be stated just in case that the invention specified by limitations of such a production method is not unclarified.

(Applications of Coating Material Composition)

The coating material composition of the present disclosure has excellent frictional resistance and can be used as a coating material for sliding materials that can be used at high temperatures and high heating environments. Examples of more specific products include members for air conditioner compressor pistons, swash plates, and scroll compressors. In particular, a member for automobile air-conditioner compressor pistons is preferred. A substrate, a coating method, and the like for such applications can be employed based on known methods.

The present disclosure also is a coating film obtained by using the coating material composition described as well as a coated article having such a film.

EXAMPLES

The present disclosure will be specifically described based on Examples below. It is noted that "%" and "parts" in the table refer to "% by mass" and "parts by mass," respectively.

Examples 1 to 9 and Comparative Examples 1 to 7

The coating material was obtained as follows. 5 parts by mass of an epoxy resin and 30 parts by mass of polytetrafluoroethylene as a filler were compounded with respect to a resin solid content of a polyamideimide varnish in which a polyamideimide resin was dissolved in N-2-ethyl pyrrolidone (NEP) (solid concentration of 34% by mass), a polyamideimide varnish in which the polyamideimide resin was dissolved in 3-methoxy-N,N-dimethylpropanamide (solid concentration of 34% by mass), or a polyamideimide varnish in which the polyamideimide resin was dissolved in N-2-butyl-2-pyrrolidone (NBP) (solid concentration of 34% by mass), dispersed and agitated by using a three-roll mill to adjust the degree of dispersion of the coating material to 5 μm or less. Moreover, the same solvent as that used for the varnish was added to aluminum oxide so that the solid concentration was 60%, to prepare an aluminum oxide solution. The aluminum oxide solution was dispersed and agitated by using a bead mill so that the degree of dispersion in the solution was 5 μm or less, to obtain an aluminum oxide dispersion. The aluminum oxide dispersion was added so that the aluminum oxide in the dispersion was 20 parts relative to the resin content of the obtained coating material, and N-ethyl-2-pyrrolidone, 3-methoxy-N,N-dimethylpropanamide, or N-butyl-2-pyrrolidone was added for dilution of the dispersion so that the solid concentration was 37% by mass, to prepare a coating material composition containing polyamideimide.

A coating material composition of each of Examples 2 to 9 and Comparative Examples 1 to 4 was also prepared in the same manner as in Example 1 except that the amount of filler added, the degree of dispersion thereof, and the type of solvent were changed.

(Coating Method)

A substrate specimen of an aluminum plate was coated with the coating material composition of each of Examples 1 to 9 and Comparative Examples 1 to 7 described by using an applicator so that the film thickness upon firing was 45 to 55 μm, dried at 120° C. for 45 minutes, and then fired at 180° C. for 45 minutes and 230° C. for 45 minutes to form a coating film to obtain a test plate.

Evaluation was conducted based on the following criteria. The results are shown in Table 1.

(Degree of Dispersion)

A 25 μm-grind gauge was used to measure the degree of dispersion by a linear method and a granular method according to JIS K5600.

(Abrasion Resistance Index)

The abrasion resistance index is measured by a ball-on-disk method. Specifically, a Friction Player FPR2200, manufactured by RHESCA CO., LTD. was used as a measurement apparatus, the coating film prepared with the coating material composition of the present invention was set in the measurement apparatus, a ϕ5 mm-zirconia ball was used as a test piece counterpart, and measurement was conducted under the conditions of load: 1.0 kgf, rotation speed: 14 mm/sec, travel distance: 7 mm, and temperature: 150° C. in a reciprocating sliding test.

(Viscosity of Coating Material)

The viscosity is measured using a Type B viscometer as described in JISZ8803. The coating material composition can be measured with a Type BII viscometer manufactured by Toki Sangyo Co., Ltd. The viscosity of the coating material composition adjusted to a temperature of 25° C., measured by using a rotating rotor #4 is the viscosity specified in the present invention.

TABLE 1

| | Viscosity cP · s | Solvent | Degree of dispersion μm | Amount of filler added Parts | Abrasion resistance index |
|---|---|---|---|---|---|
| Example 1 | 16000 | NEP | 5 | 20 | 110 |
| Example 2 | 16000 | 3-Methoxy-N,N-dimethylpropanamide | 5 | 20 | 110 |
| Example 3 | 16000 | NBP | 5 | 20 | 110 |
| Example 4 | 16000 | NEP | 5 | 30 | 120 |
| Example 5 | 16000 | 3-Methoxy-N,N-dimethylpropanamide | 5 | 30 | 120 |
| Example 6 | 16000 | NBP | 5 | 30 | 120 |
| Example 7 | 16000 | NEP | 5 | 10 | 100 |
| Example 8 | 16000 | 3-Methoxy-N,N-dimethylpropanamide | 5 | 10 | 100 |
| Example 9 | 16000 | NBP | 5 | 10 | 100 |
| Comparative Example 1 | 16000 | NEP | 5 | 5 | 30 |
| Comparative Example 2 | 16000 | NEP | 20 | 10 | 50 |
| Comparative Example 3 | 16000 | 3-Methoxy-N,N-dimethylpropanamide | 5 | 5 | 30 |
| Comparative Example 4 | 16000 | 3-Methoxy-N,N-dimethylpropanamide | 20 | 10 | 50 |
| Comparative Example 5 | 5000 | 3-Methoxy-N,N-dimethylpropanamide | 5 | 20 | 50 |
| Comparative Example 6 | 30000 | 3-Methoxy-N,N-dimethylpropanamide | 5 | 20 | 50 |
| Comparative Example 7 | 16000 | NMP | 20 | 5 | 100 |

As shown in the results in Table 1, the coating material composition of the present disclosure being substantially free of N-methyl-2-pyrrolidone can form a coating film having performance equivalent to that of a conventional coating material composition containing N-methyl-2-pyrrolidone (Comparative Example 7).

INDUSTRIAL APPLICABILITY

The coating material composition of the present disclosure can be used in coating of various sliding members, in particular automobile air-conditioner compressor pistons.

What is claimed is:

1. A coating material composition comprising polytetrafluoroethylene, a polyamideimide resin, a filler and at least one solvent selected from the group consisting of N-ethyl-2-pyrrolidone, 3-methoxy-N,N-dimethylpropaneamide, and N-butyl-2-pyrrolidone, and being substantially free of N-methyl-2-pyrrolidone,
    wherein the filler has a hardness of 7 to 12 on a new Mohs hardness scale and a primary particle size of 1 μm or less,
    wherein a content of the filler is 10 to 30 parts by mass relative to 100 parts by mass of a solid content of the polyamideimide resin in the coating material components,
    wherein the coating material composition has a viscosity of 10,000 to 20,000 cps, and
    wherein a degree of dispersion of a coating material as measured according to JIS K5600 with a grind gauge is 5 μm or less.

2. The coating material composition according to claim 1, wherein the coating material composition comprises at least one solvent selected from the group consisting of N-ethyl-2-pyrrolidone, 3-methoxy-N,N-dimethylpropaneamide, and N-butyl-2-pyrrolidone.

3. The coating material composition according to claim 1, wherein the filler is at least one selected from the group consisting of aluminum oxide and silicon dioxide.

4. The coating material composition according to claim 1, further comprising at least one resin selected from the group consisting of polyethersulfone (PES), polyetheretherketone (PEEK), and polyimide (PI).

5. The coating material composition according to claim 1, wherein the coating material composition is for automobile air-conditioner compressor pistons.

6. A coating film formed from the coating material composition according to claim 1.

7. The coating film according to claim 6, wherein the coating film has an abrasion resistance of 100 or more.

8. A coated article comprising the coating film according to claim 6 on the surface thereof.

\* \* \* \* \*